(12) United States Patent
Crawford et al.

(10) Patent No.: US 7,905,508 B2
(45) Date of Patent: Mar. 15, 2011

(54) HITCH MOUNTED RECEIVER PLATFORM AND COMPLEMENTARY WAGON

(75) Inventors: Trish Crawford, San Jose, CA (US); Kent Crawford, Modesto, CA (US)

(73) Assignee: C2it, Modesto, CA (US)

( * ) Notice: Subject to any disclaimer, the term of this patent is extended or adjusted under 35 U.S.C. 154(b) by 436 days.

(21) Appl. No.: 11/957,380

(22) Filed: Dec. 14, 2007

(65) Prior Publication Data
US 2008/0150253 A1 Jun. 26, 2008

Related U.S. Application Data

(60) Provisional application No. 60/876,339, filed on Dec. 21, 2006.

(51) Int. Cl.
*B60D 1/46* (2006.01)

(52) U.S. Cl. ............. 280/490.1; 224/519; 224/524

(58) Field of Classification Search .......... 280/490.1; 224/519, 520, 521, 524, 530
See application file for complete search history.

(56) References Cited

U.S. PATENT DOCUMENTS

| 2,395,039 | A * | 2/1946 | Crosby | 280/831 |
| 6,296,163 | B1 * | 10/2001 | Kitao et al. | 224/401 |
| 6,513,690 | B1 * | 2/2003 | Churchill et al. | 224/498 |
| 7,380,803 | B2 * | 6/2008 | Thomas | 280/33.992 |
| 7,513,730 | B2 * | 4/2009 | Goyanko | 414/462 |
| 2006/0118586 | A1 * | 6/2006 | Heravi | 224/519 |
| 2009/0152314 | A1 * | 6/2009 | Myrex | 224/502 |
| 2009/0159627 | A1 * | 6/2009 | Myrex | 224/495 |

* cited by examiner

*Primary Examiner* — Paul N Dickson
*Assistant Examiner* — Tashiana Adams
(74) *Attorney, Agent, or Firm* — Perkins Coie LLP

(57) ABSTRACT

A removable wagon may be attached to a hitch insert for transportation by a vehicle. After transport the wagon may be rolled by the user to a desired location. Devices for hitching the wagon to the vehicle are described.

15 Claims, 14 Drawing Sheets

400

900 →

1100 ⟶

1200 ⟶

HITCH MOUNTED RECEIVER PLATFORM AND COMPLEMENTARY WAGON

RELATED APPLICATIONS

This application claims priority to U.S. Provisional Patent Application No. 60/876,339 filed Dec. 21, 2006, and entitled "Hitch Mounted Receiver Platform and Complementary Wagon" by Trish Crawford and Kent Crawford, which is incorporated herein by reference.

BACKGROUND

Individuals often need to move large amounts of gear or equipment to different locations. In many situations the gear or equipment cannot be easily be loaded into a vehicle. A possible solution is a cargo carrier attached to a car or truck, allowing a user to move equipment without loading the items into the vehicle. Such systems have limited mobility as they cannot be rolled. Gear must be carried from a vehicle to a destination. Another option is a toy or garden wagon which would allow individuals to roll but such wagons must be carried in a vehicle taking up valuable space. What is needed is a rolling device for transporting gear that may be attached externally to a vehicle.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

This disclosure relates to hitch-based cargo and recreational gear carriers, specifically a removable wagon that can be lifted from a hitch insert & then rolled to a user's preferred destination.

One example is the Xtreme Wagon™ from Gear In Motion. Such a wagon allows individuals to move gear (recreational equipment) from a vehicle to events (such as soccer games and baseball games) in one simple step. Simply unhook the wagon from a car & roll it to an event.

A wagon may attach to a pivot hitch or a tilt hitch for assisted lifting of the wagon to a travel height. The wagon may be locked in place for travel. Advantageously, an individual is not required to bear the full weight of the wagon while lifting.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
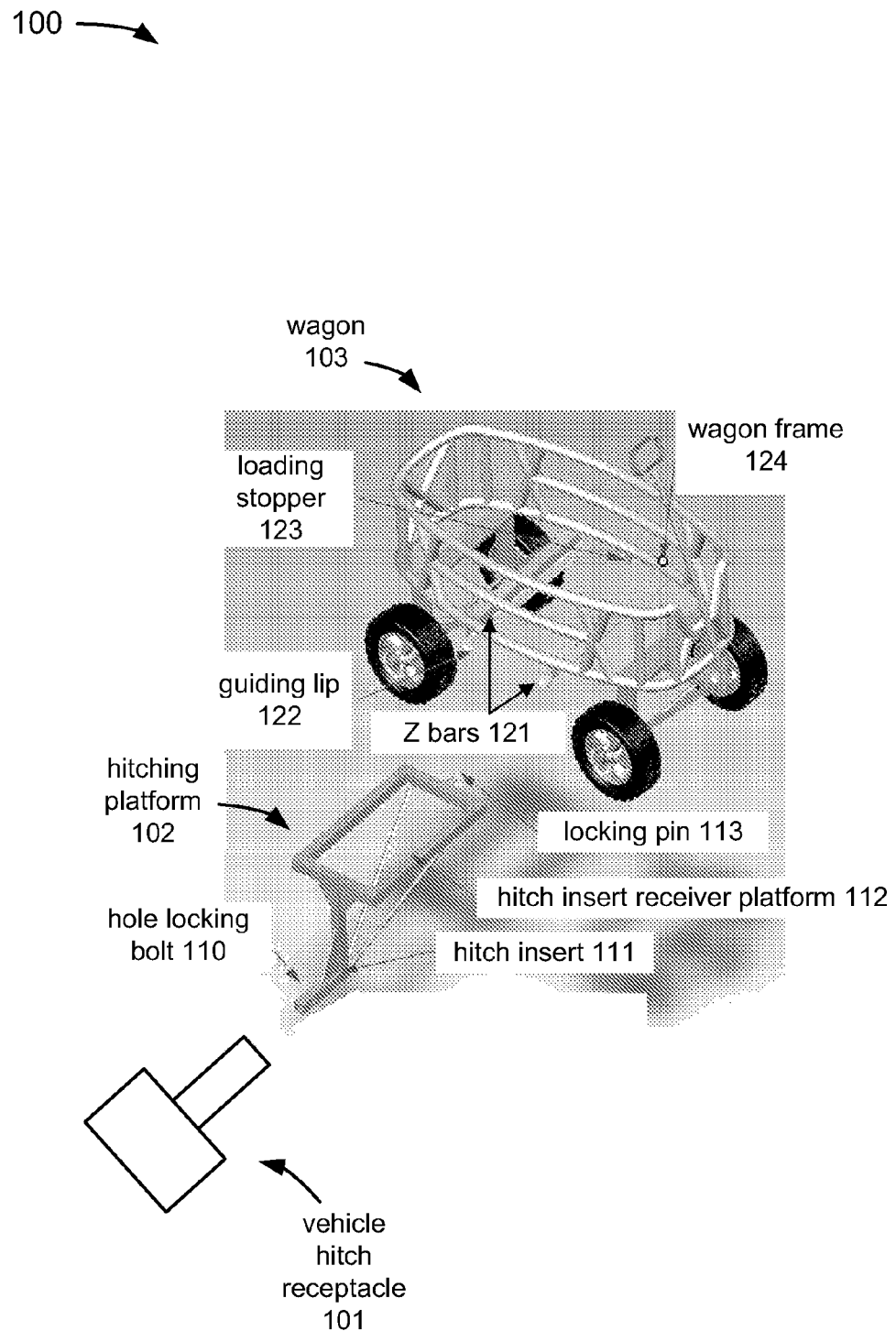
FIG. 1 depicts an example of a system including a receiver platform and a complementary wagon.

FIG. 1 depicts an example of a system 100 including a receiver platform and a complementary wagon. FIG. 1 includes vehicle hitch receptacle 101, hitching platform 102, and wagon 103.

The vehicle hitch receptacle 101 may be a "tow hitch," or "tow point," attached to a chassis of a vehicle for towing. The vehicle hitch receptacle 101 may be one of a class of tow hitches, for example, class I to 2000 lbs, class II 3500 lbs, class III to 5000 lbs, or IV 10,000 lbs.

The hitching platform 102 includes hole locking bolt 110, hitch insert 111, hitch insert receiver platform 112, and locking pin 113. The hitching platform 102 may be constructed from a strong load bearing material such as steel, high-strength light-weight alloy or other known or convenient material.

The hitch insert 111 may be an extended portion of the hitching platform 102 sufficiently load bearing to support the weight of the wagon 103 including loaded items. The hole locking bolt 110, may be a hole though the hitch insert 111, the positioning and the diameter of the hole may be as is known or convenient relative to the vehicle hitch receptacle 101.

The hitch insert receiver platform 112 may be formed relative to the Z-bars 121 to slide into the Z-bars 121 of the wagon frame 124. The hitch insert receiver platform 112 as depicted is formed of right angles so as to provide a fitted connection with the Z-bars 121, however, any known or convenient form may be used. In a non-limiting example, the Z-bars 121 and hitch insert receiver platform 112 are formed of trapezoidal structure, a circular structure, or other known or convenient structure so as to allow for the wagon frame 124 and the hitch insert receiver platform 112 to slide together.

The locking pin 113 may be a rounded bar extending from the hitch insert receiver platform 112 paired with a hole in the loading stopper 123. The shape of the locking pin 113 may be squared, rectangular, trapezoidal, circular, or other shape known or convenient so as to connect with loading stopper 123 to provide a secure locked position during travel. A clip or other device may be connected to locking pin 113 to secure the locking pin 113 to the loading stopper 123.

The wagon 103 includes Z-bars 121, guiding lip 122, loading stopper 123, and wagon frame 124. The Z-bars 121 may be shaped relative to the hitch insert receiver platform 112, and may be squared, rectangular, trapezoidal, circular, or other known or convenient shape allowing the Z-bars 121 to slide on the hitch insert receiver platform 112 to form a stable connection during transport of the wagon 103. The guiding lip 122 extends as a portion of each Z bar ensuring the stable connection.

The frame of the wagon frame 124 may be fabricated from a light-weight high-strength material and formed in an aesthetically pleasing manner so as to produce an attractive means of transport of items while providing a stable manner of storage during transport. Bars of the wagon 103 may be formed to allow for points to tie items to, and to provide for straps and other devices for securing items within the wagon frame 124. The wagon frame 124 may include cargo netting. The wagon frame 124 may include one or more pouches for placing items in.

Figure 2:
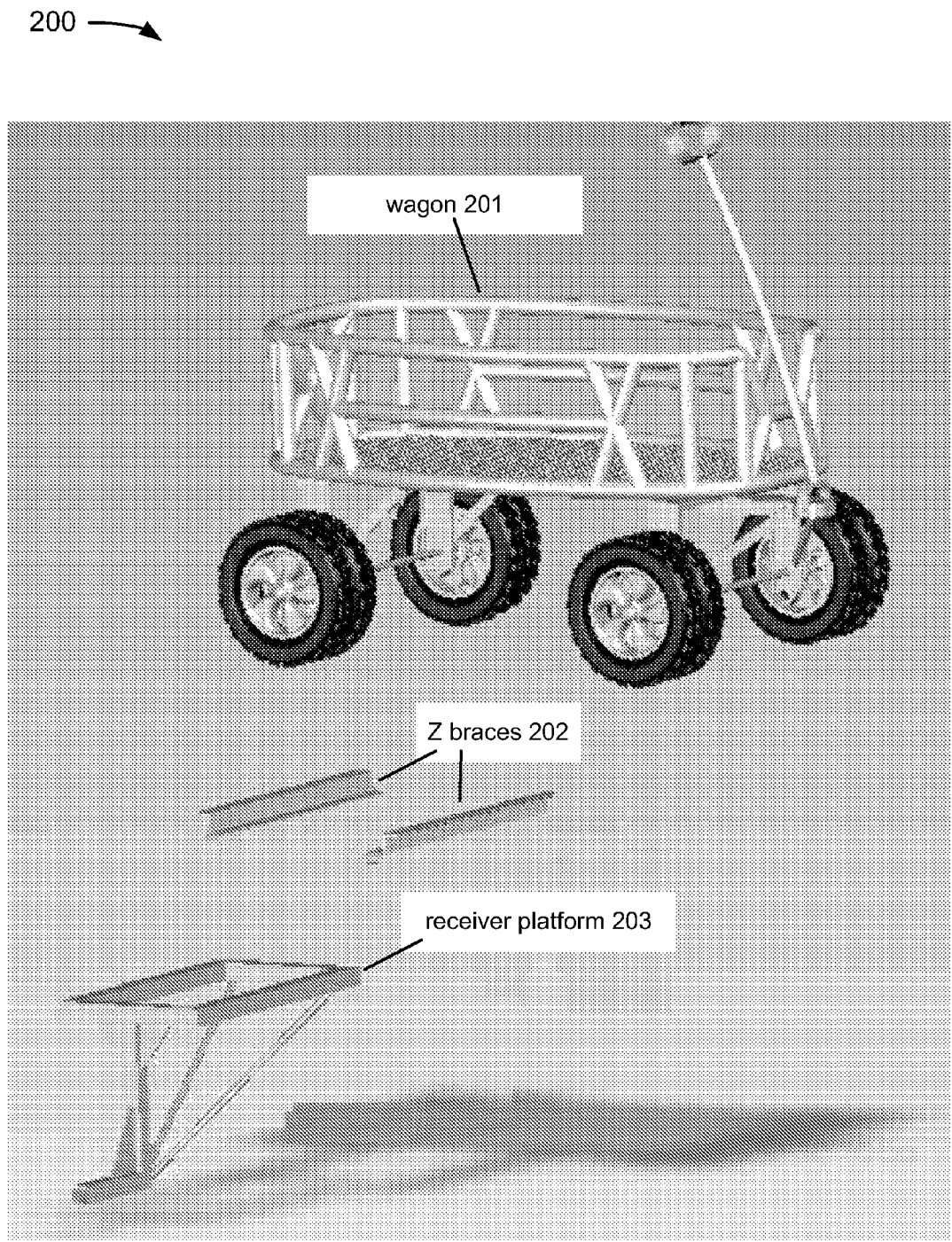
FIG. 2 depicts an example of a system including a receiver platform and a complementary wagon with Z braces separated from the wagon.

FIG. 2 depicts an example of a system 200 including a receiver platform and a complementary wagon with Z braces separated from the wagon. FIG. 2 includes wagon 201, Z braces 202, and receiver platform 203. In FIG. 2 the Z braces 202 are separated from the wagon 201 for visibility.

Figure 3:
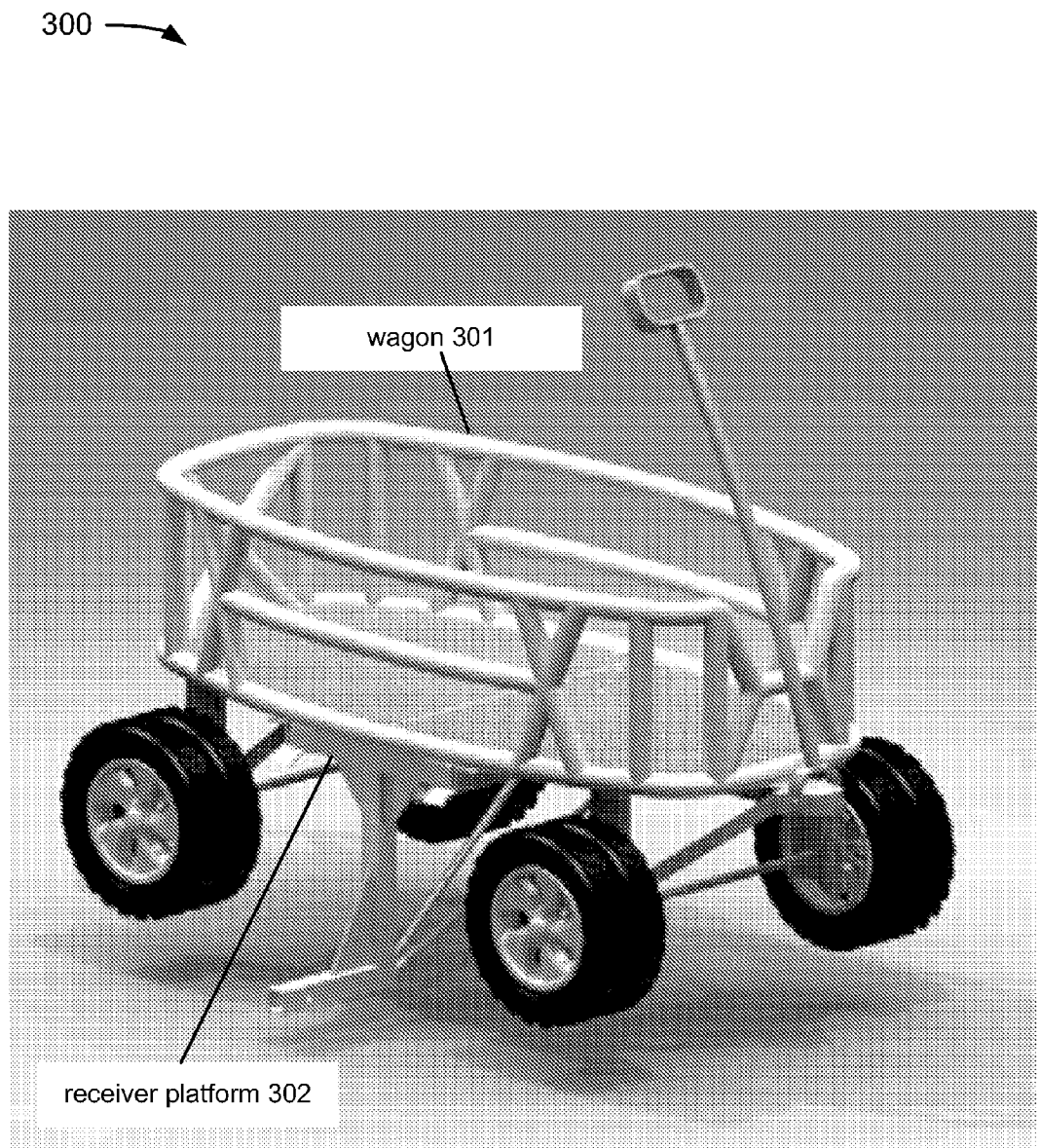
FIG. 3 depicts an example of a system including a receiver platform and a complementary wagon connected together.

FIG. 3 depicts an example of a system 300 including a receiver platform and a complementary wagon connected together. FIG. 3 includes wagon 301 and receiver platform 302. FIG. 3 depicts receiver platform and wagon 301 connected for transport by a vehicle.

Figure 4:
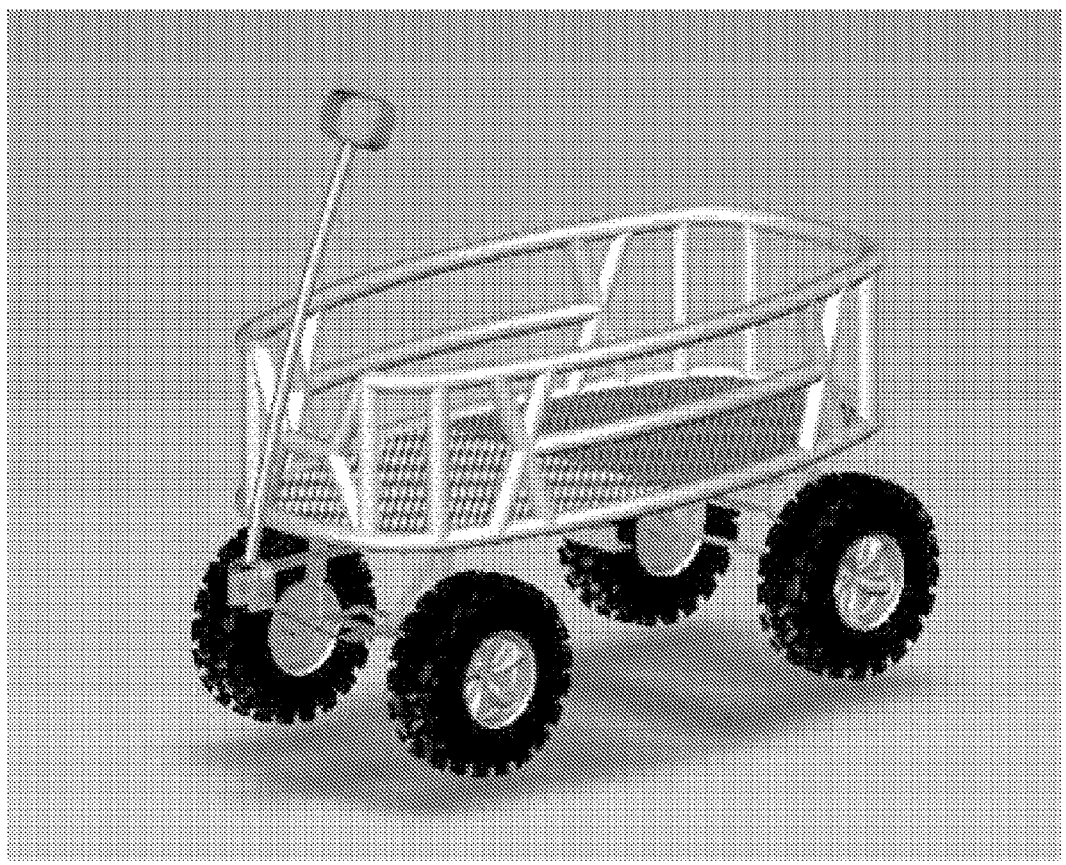
FIG. 4 depicts an example of a wagon.

FIG. 4 depicts an example of a wagon 400. The depiction provides an alternative angle to view the wagon 400.

Figure 5:
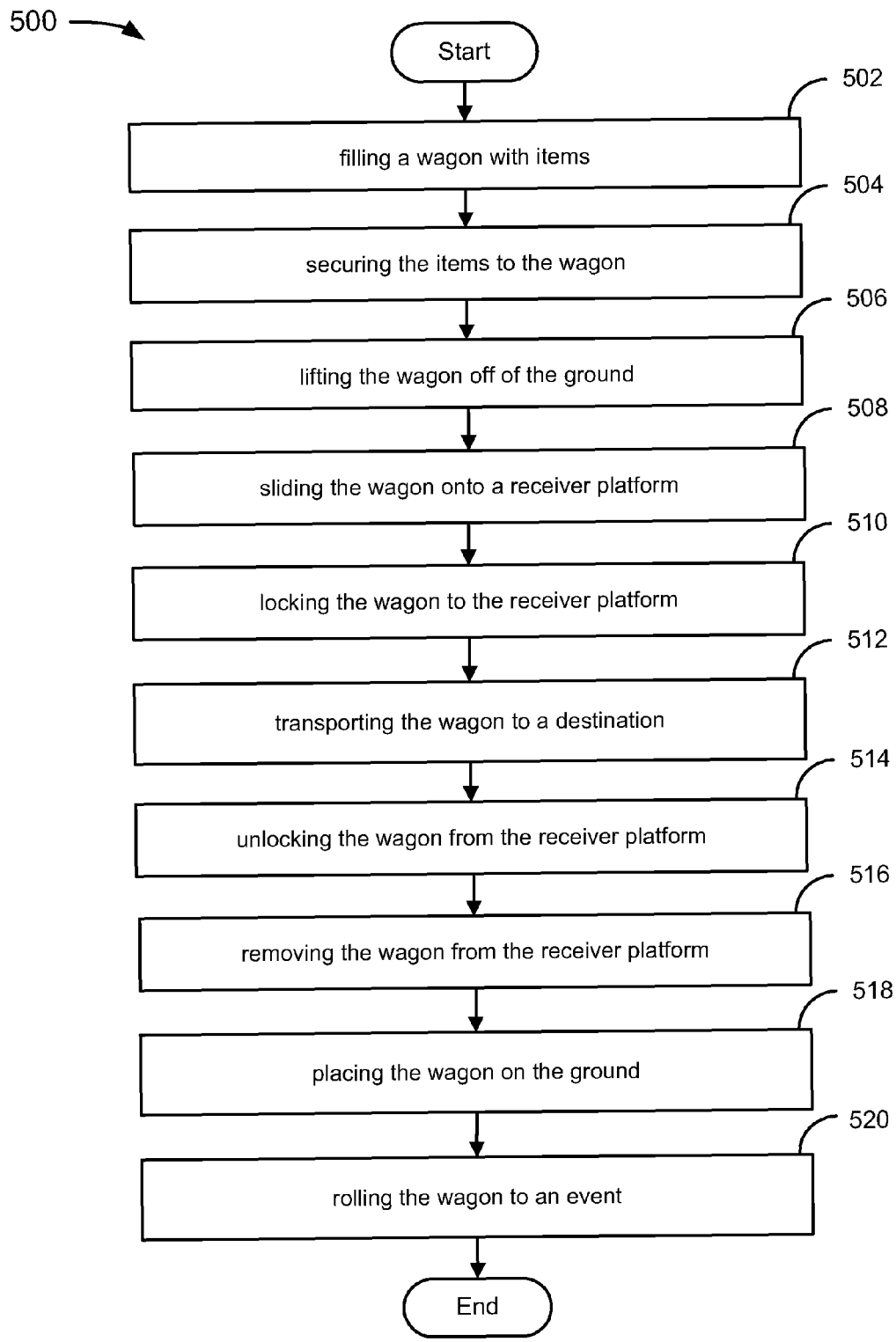
FIG. 5 depicts an example of a flowchart of a method for using a wagon.

FIG. 5 depicts an example of a flowchart 500 of a method for using a wagon. The method is organized as a sequence of modules in the flowchart 500. However, it should be understood that these and modules associated with other methods described herein may be reordered for parallel execution or into different sequences of modules where is known or convenient.

In the example of FIG. 5, the flowchart 500 starts at module 502 with filling a wagon with items. Such items may include any desirable gear, food, clothing, or other items needed for an event. In an non-limiting example, the event is a soccer game, and chairs, food, and drinks are loaded into the wagon.

In the example of FIG. 5, the flowchart 500 continues to module 504 with securing the items to the wagon. Straps, rope, tape, cargo netting, or another manner of securing items to the wagon may be employed. In some methods, the wagon may be transported externally to a vehicle, and securing the items may prevent the items from being lost from the wagon during transport.

In the example of FIG. 5, the flowchart 500 continues to module 506 with lifting the wagon off of the ground. With a receiver platform coupled to vehicle tow receptacle, it may be necessary to raise the wagon to a height sufficient to line Z-bars with a receiver platform.

In the example of FIG. 5, the flowchart 500 continues to module 508 with sliding the wagon onto a receiver platform. After lining up Z-bars with a receiver platform, the wagon may be slid onto the Z-bars. The weight of the wagon and all items included therein may be supported by the receiver platform.

In the example of FIG. 5, the flowchart 500 continues to module 510 with locking the wagon to the receiver platform. A locking pin may be passed through a loading stopper and fixed in place. In a non-limiting example a clip is passed through locking pin to prevent movement.

In the example of FIG. 5, the flowchart 500 continues to module 512 with transporting the wagon to a destination. A vehicle having the wagon attached via the receiver platform may be driven to the destination.

In the example of FIG. 5, the flowchart 500 continues to module 514 with unlocking the wagon from the receiver platform. A clip or other locking device may be disabled.

In the example of FIG. 5, the flowchart 500 continues to module 516 with removing the wagon from the receiver platform. The wagon may be slid off of the receiving platform.

In the example of FIG. 5, the flowchart 500 continues to module 518 with placing the wagon on the ground. An individual may place the wagon on its wheels to be rolled to an event.

In the example of FIG. 5, the flowchart 500 continues to module 520 with rolling the wagon to an event. Advantageously, an individual may avoid carrying items to an event. Having transported the wagon to an event, the flowchart terminates.

Figure 6:
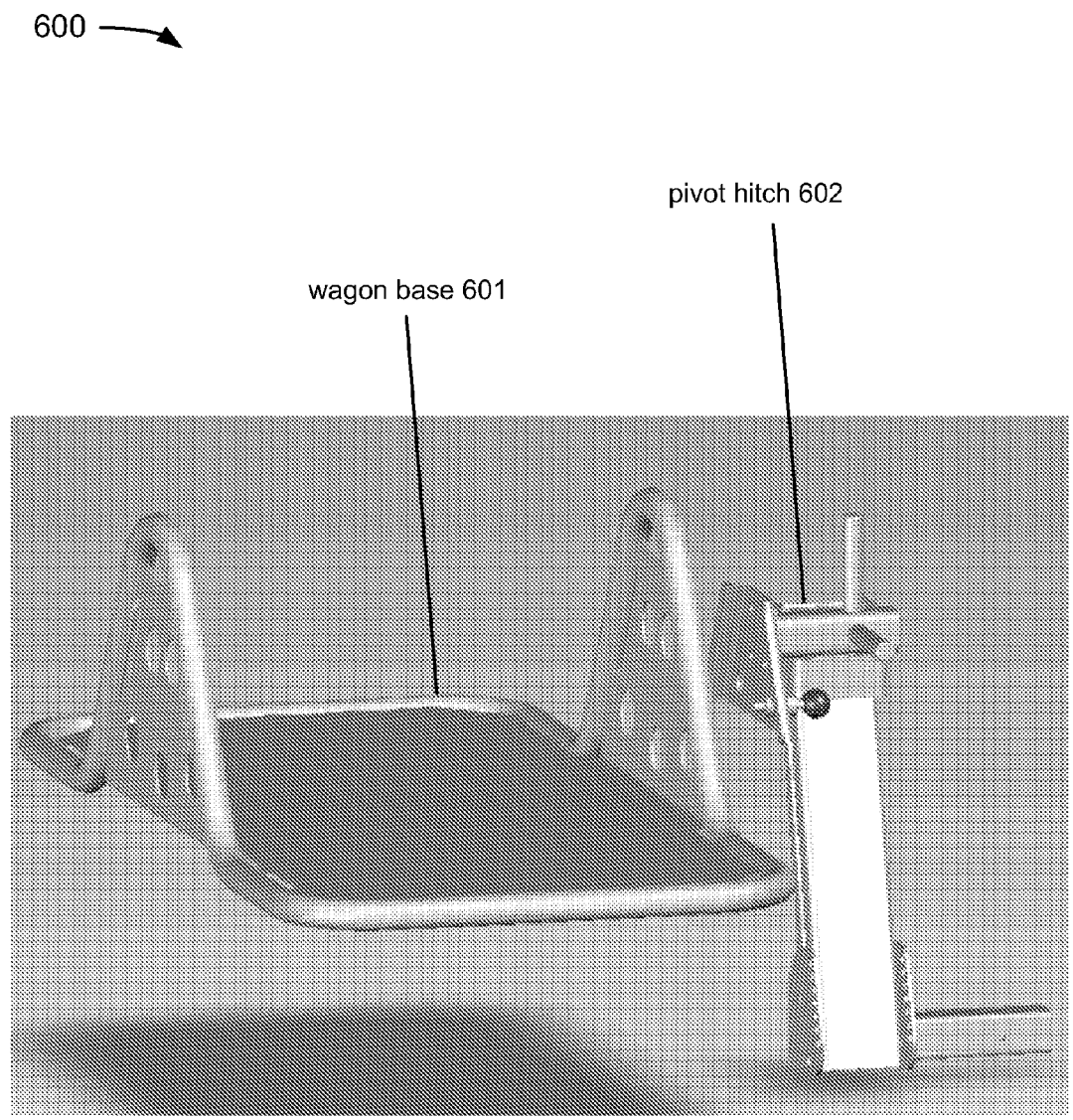
FIG. 6 depicts an example of a system including a wagon and a pivot hitch.

FIG. 6 depicts an example of a system 600 including a wagon and a pivot hitch. The system 600 includes wagon base 601 and pivot hitch 602. Each of the wagon base 601 and the pivot hitch 602 may be made of steel, a light-weight high-strength alloy, or any known or convenient material.

Figure 7:
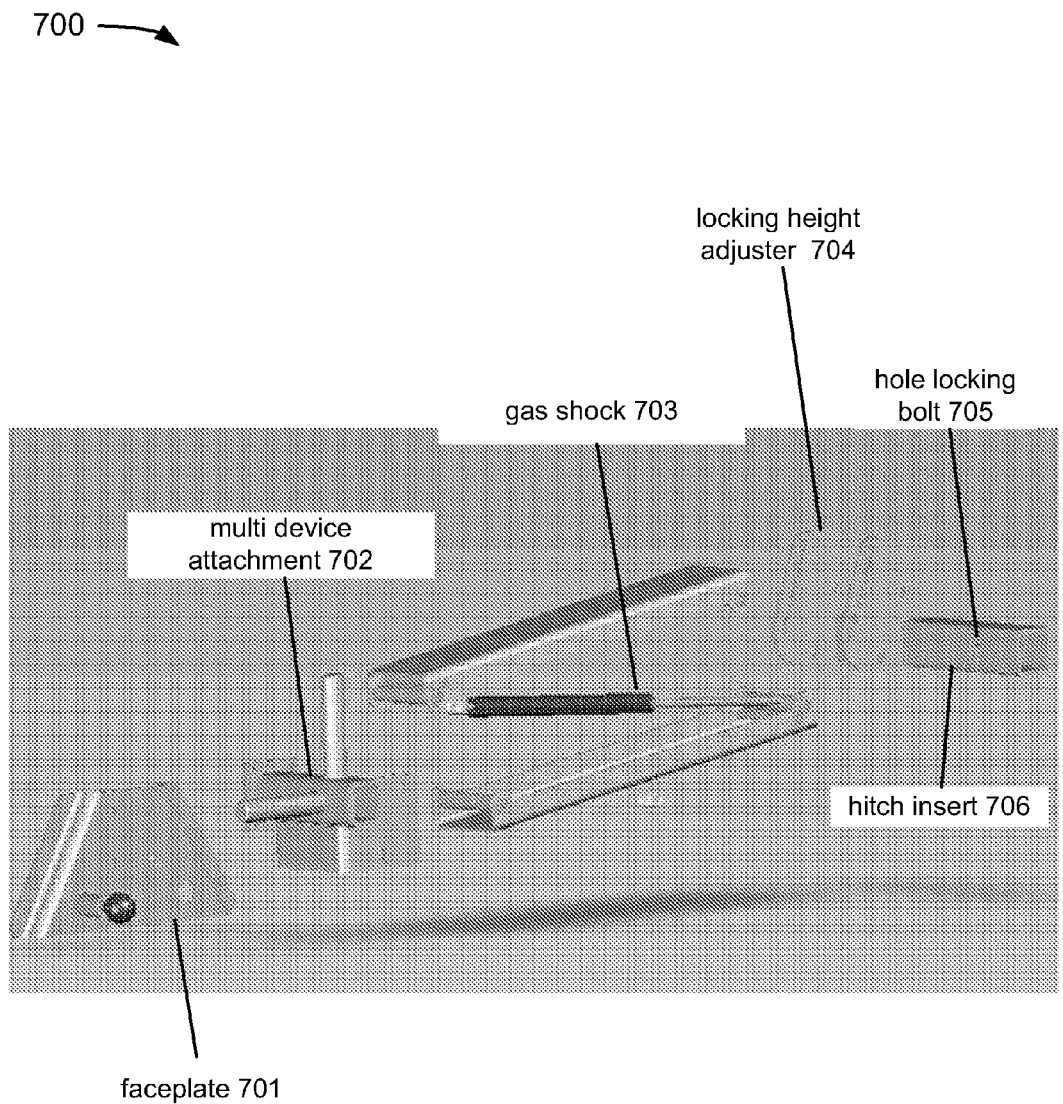
FIG. 7 depicts an example of a pivot hitch, disassembled.

FIG. 7 depicts an example of a pivot hitch 700, disassembled. FIG. 7 includes faceplate 701, multi device attachment 702, gas shock 703, locking height adjuster 704, hole locking bolt 705, and hitch insert 706.

The faceplate 701 includes rails having groves to slide into a faceplate adapter coupled to or part of a wagon base. The faceplate 701 may have a locking device to attach to the faceplate adapter of the wagon base.

The multi device attachment 702 may include one or more devices for attaching to items other than a wagon such as a bicycle rack, a ski rack, or other device for transporting items.

The gas shock 703 may be any device for applying pressure to support weight on the pivot arm during the lifting of a device attached to the faceplate 701. The locking height adjuster 704 includes a plurality of holes for locking the pivot arm at various heights.

Hitch insert 706 may be an extended portion of the hitching platform 102 sufficiently load bearing to support the weight of a wagon including loaded items. The hitch insert 706 includes hole locking bolt 705. The positioning and the diameter of the hole may be as is known or convenient relative to a vehicle hitch receptacle.

Figure 8:
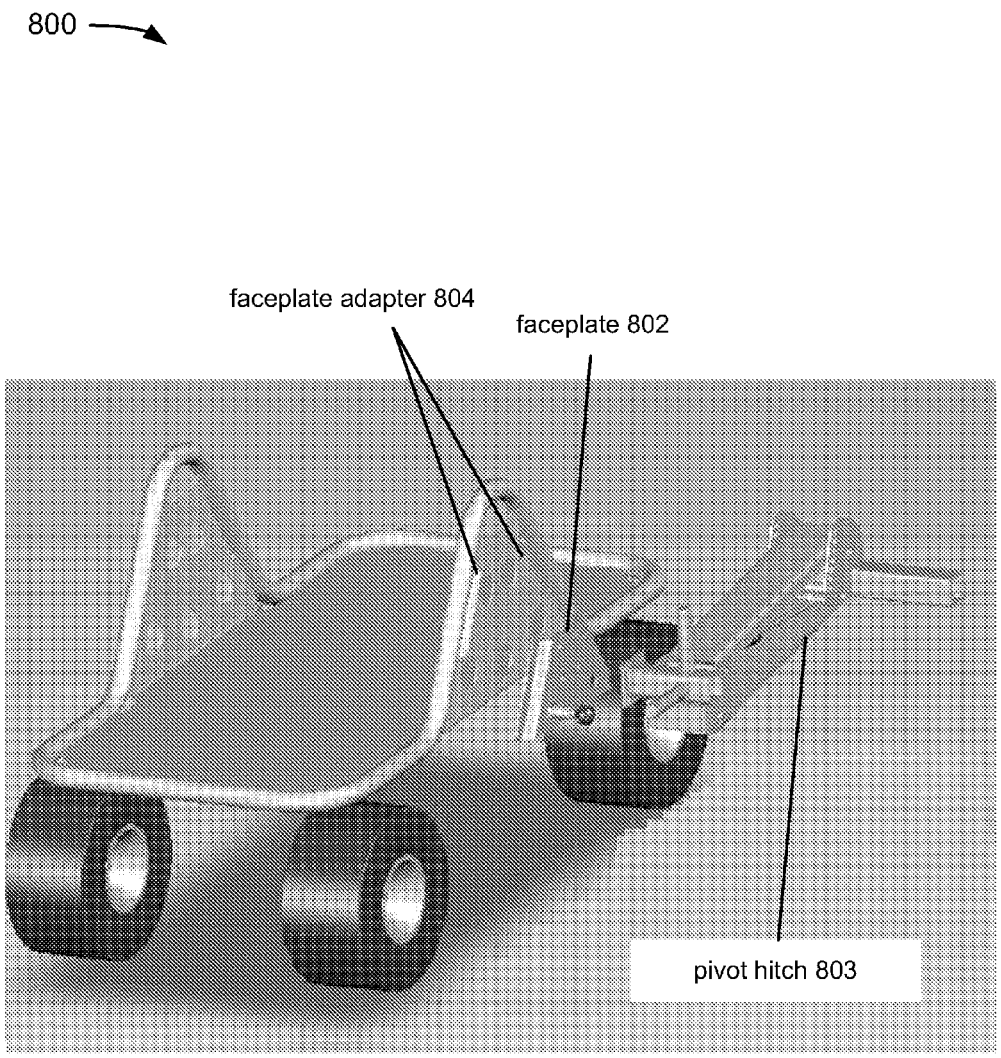
FIG. 8 depicts an example of a system including a pivot hitch and a wagon base with wheels.

FIG. 8 depicts an example of a system 800 including a pivot hitch and a wagon base with wheels. FIG. 8 includes faceplate 802, pivot hitch 803, and faceplate adapter 804. In operation, the faceplate adapter 804 may be slid onto and locked to the faceplate 802. The faceplate 802 is coupled to the pivot hitch 803. An individual may raise a loaded wagon off of the ground assisted by the pivot hitch 803.

Figure 9:
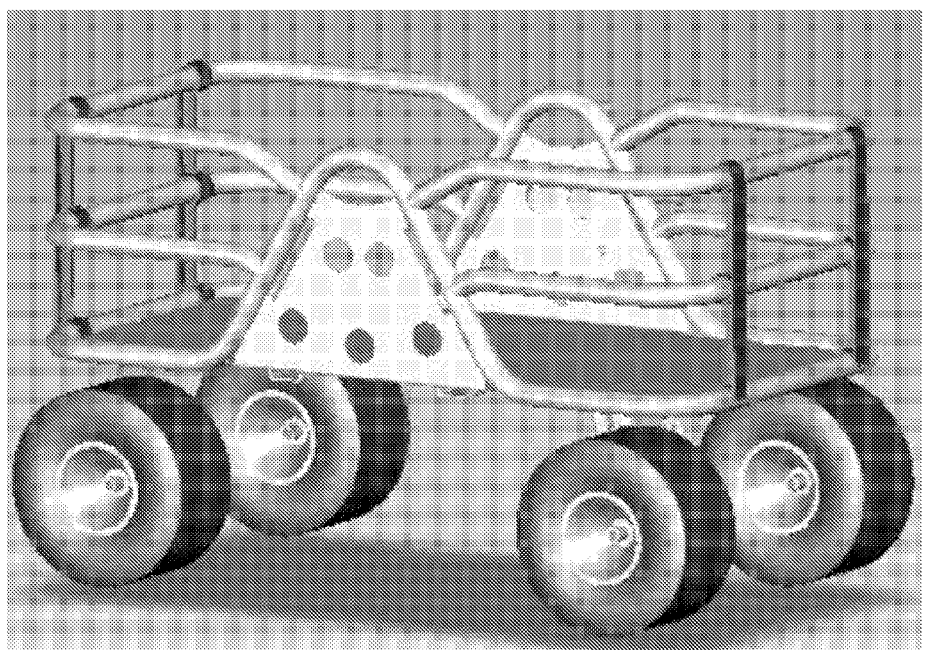
FIG. 9 depicts an example of a wagon.

FIG. 9 depicts an example of a wagon 900. The depiction provides an alternative view of the wagon.

Figure 10:
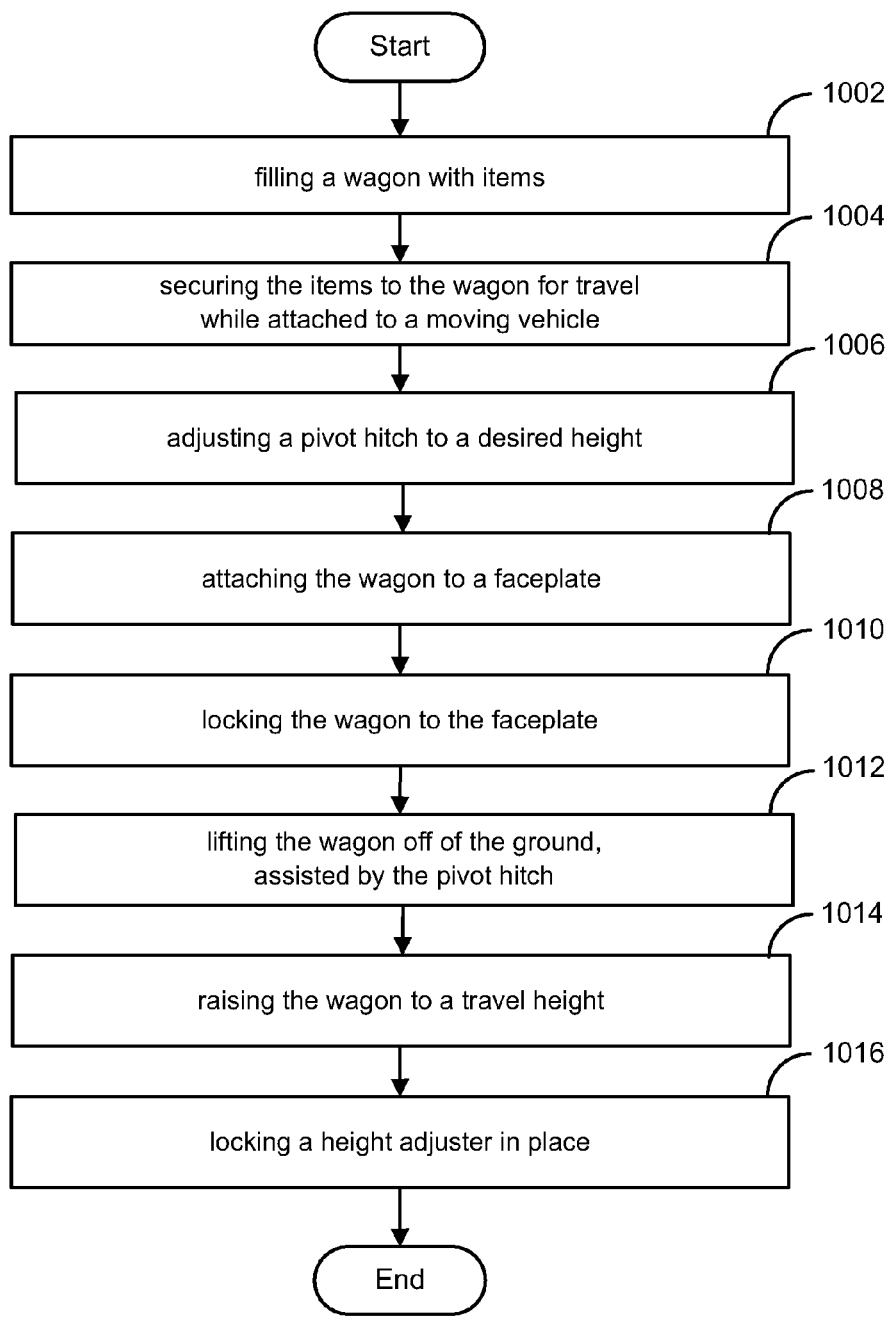
FIG. 10 depicts an example of a flowchart of a method for using a wagon with a pivot hitch.

FIG. 10 depicts an example of a flowchart 1000 of a method for using a wagon with a pivot hitch. The method is organized as a sequence of modules in the flowchart 1000. However, it should be understood that these and modules associated with other methods described herein may be reordered for parallel execution or into different sequences of modules.

In the example of FIG. 10, the flowchart 1000 starts at module 1002 with filling a wagon with items. Items may be chairs, food, drinks, or any items desirable.

In the example of FIG. 10, the flowchart 1000 continues to module 1004 with securing the items to the wagon for travel while attached to a moving vehicle. Straps, cargo netting, rope or other devices may be used to secure the items to the wagon.

In the example of FIG. 10, the flowchart 1000 continues to module 1006 with adjusting a pivot hitch to a desired height. Initially, the pivot hitch may be lowered to an optimal loading height.

In the example of FIG. 10, the flowchart 1000 continues to module 1008 with attaching the wagon to a faceplate. Having lowered the pivot hitch to an optimal height, the wagon faceplate adapter maybe slid onto the faceplate of the pivot hitch securing the wagon to the faceplate.

In the example of FIG. 10, the flowchart 1000 continues to module 1010 with locking the wagon to the faceplate. A clip, bolt, pin, or other device may be used to secure the wagon to the faceplate.

In the example of FIG. 10, the flowchart 1000 continues to module 1012 with lifting the wagon off of the ground, assisted by the pivot hitch. A gas shock included in the pivot hitch may bear some weight of the loaded wagon. The wagon may be more easily lifted to an appropriate height.

In the example of FIG. 10, the flowchart 1000 continues to module 1014 with raising the wagon to a travel height. The wagon may be raised to a travel height or other height as is desired.

In the example of FIG. 10, the flowchart 1000 continues to module 1016 with locking a height adjuster in place. Having prepared the wagon for travel, the flowchart terminates.

Figure 11:
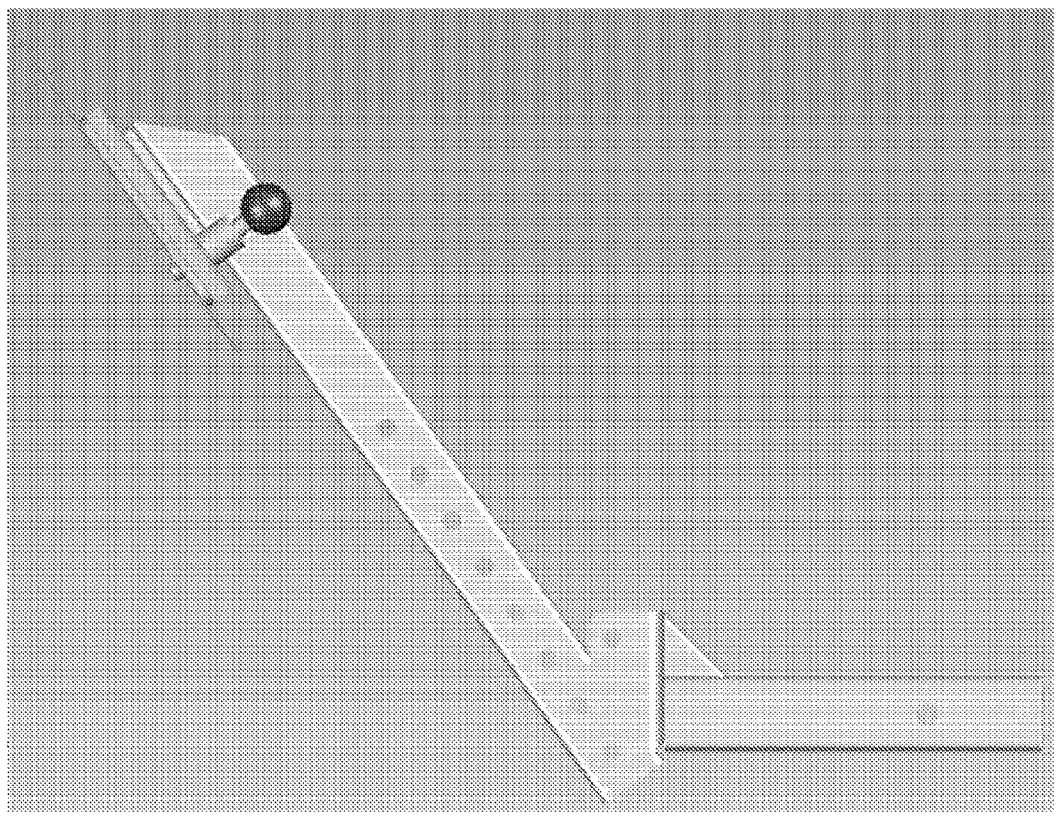
FIG. 11 depicts an example of a tilt hitch.

FIG. 11 depicts an example of a tilt hitch 1100. The depiction provides a view of the tilt hitch independent of other devices.

Figure 12:
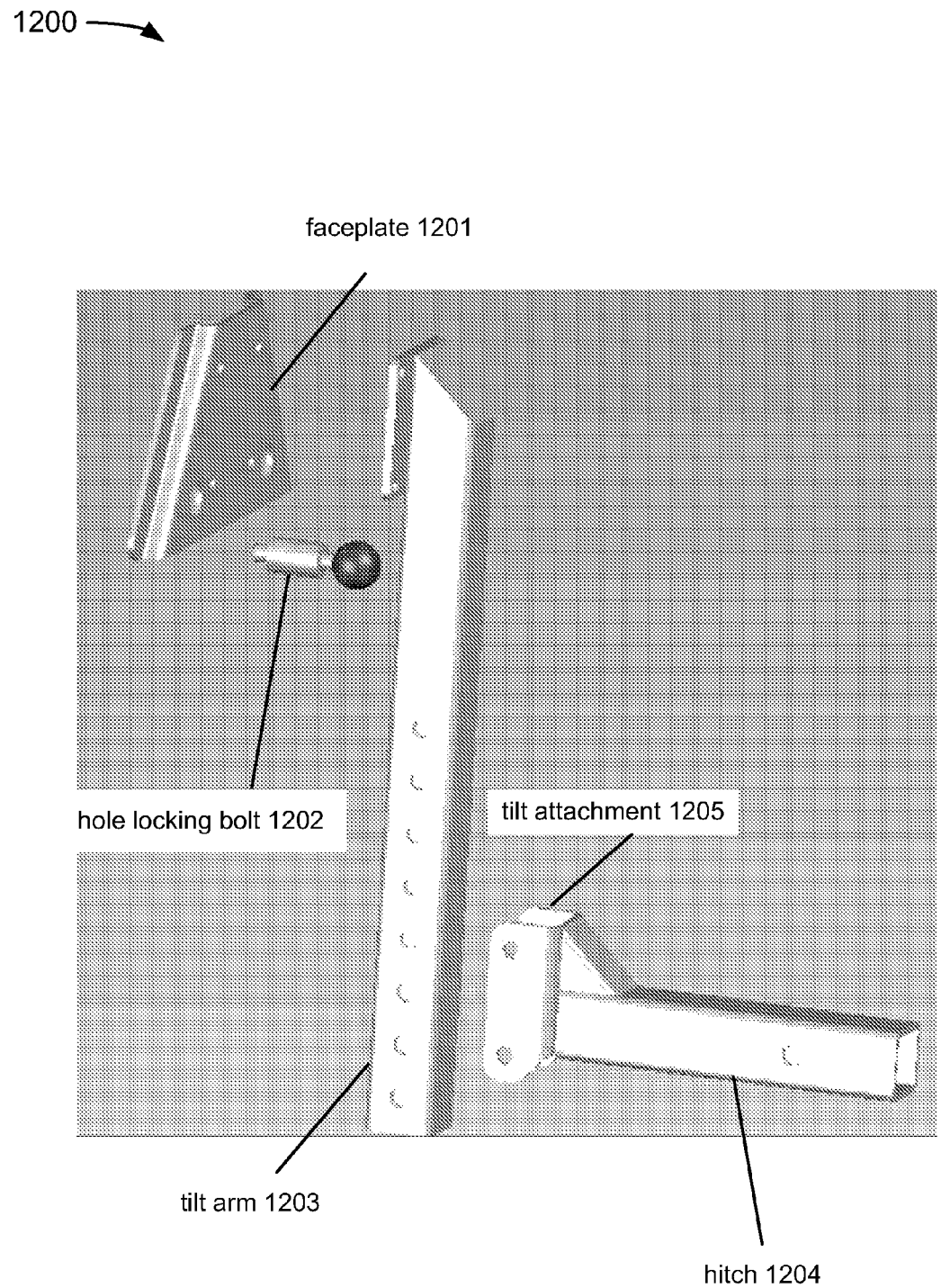
FIG. 12 depicts an example of a tilt hitch disassembled.

FIG. 12 depicts an example of a tilt hitch disassembled 1200. FIG. 12 includes faceplate 1201, hole locking bolt 1202, tilt arm 1203, and hitch 1204.

Faceplate 1201 includes grooves for attachment to a faceplate adapter. The hole locking bolt 1202 is displayed as a cylindrical device, however, any shape could be used, e.g., square. The hole locking bolt 1202 may be passed through the faceplate 1201 so as to prevent movement of the faceplate 1201 relative to a faceplate adapter.

Hitch 1204 includes a tilt attachment 1205 receiving the tilt arm 1203. The tilt attachment 1205 may be slanted so as to allow the tilt arm 1203 to tilt when attached to the hitch 1204. The hitch 1204 also includes a hole for attachment to a hitch receptacle. The hitch receptacle may be bolted to the hitch 1204 to prevent movement of the hitch 1204.

Figure 13:
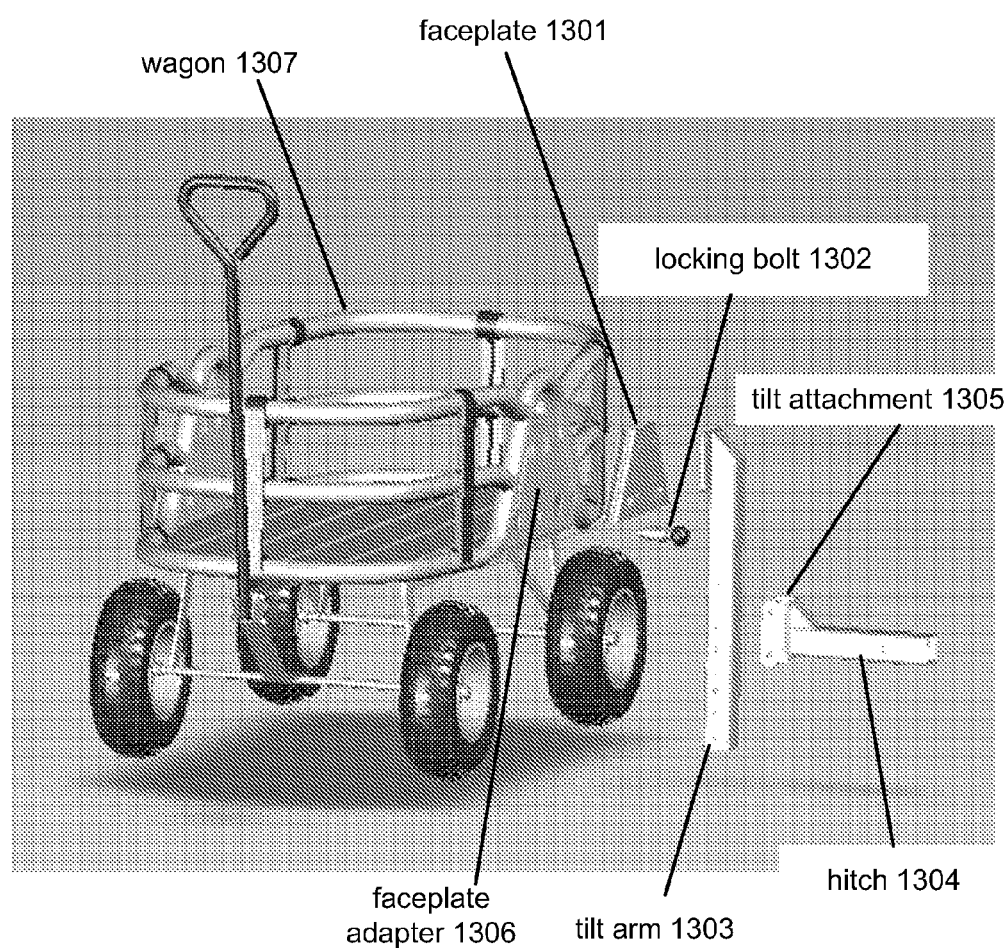
FIG. 13 depicts an example of a system including a wagon with a disassembled tilt hitch.

FIG. 13 depicts an example of a system 1300 including a wagon with a disassembled tilt hitch. The system includes faceplate 1301, locking bolt 1302, tilt arm 1303, hitch 1304, tilt attachment 1305, faceplate adapter 1306, and wagon 1307.

In operation, the faceplate adapter 1306 of the wagon 1307 connects to the faceplate 1301 and is locked in place by the locking bolt 1302. The faceplate 1301 is coupled to the tilt arm 1303, and the tilt arm 1303 is coupled to the tilt attachment 1305 of the hitch 1304. The hitch 1304 is connected to a hitch receptacle of a vehicle.

Figure 14:
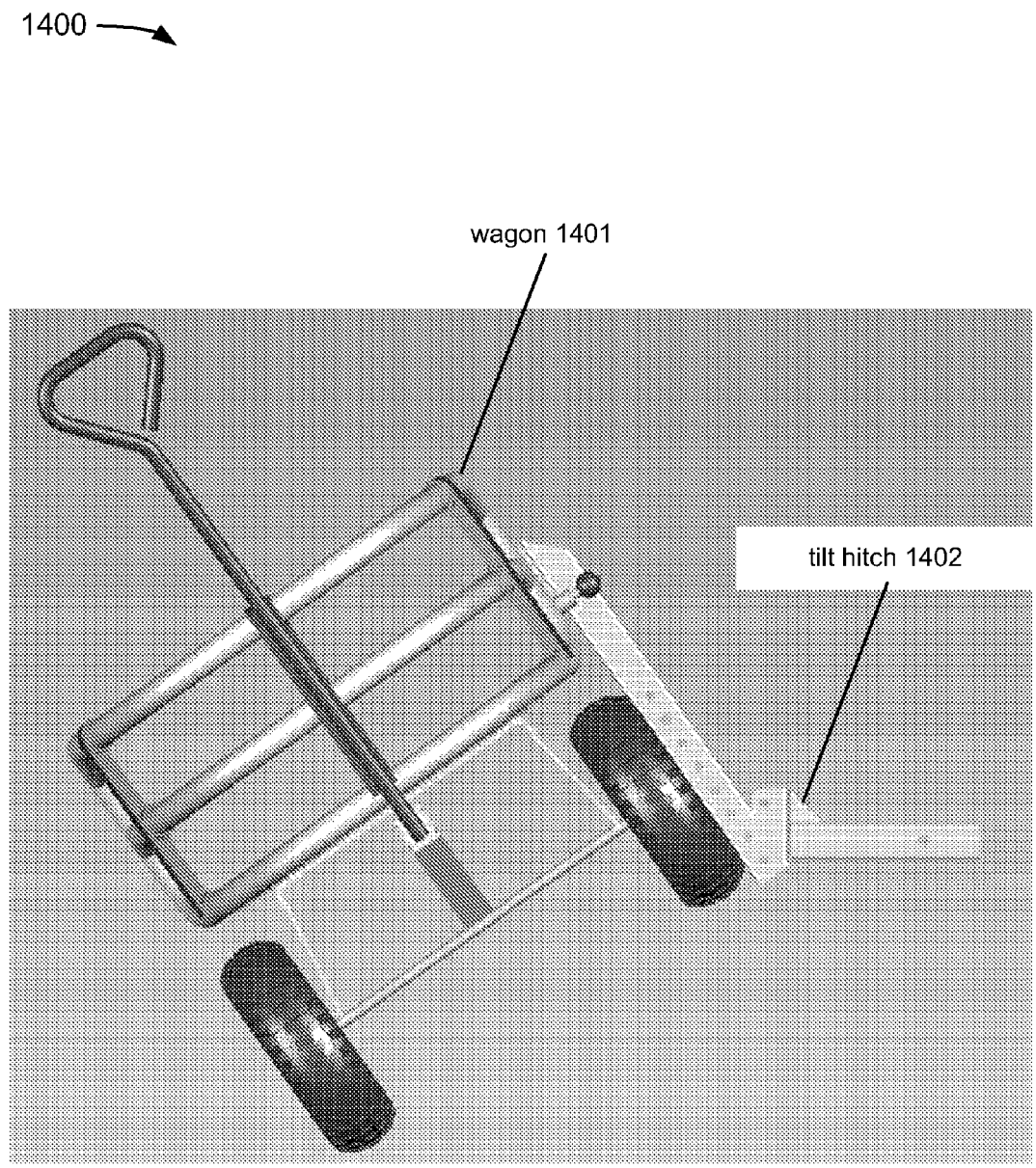
FIG. 14 depicts an example of a system including a wagon and a tilt hitch.

FIG. 14 depicts an example of a system 1400 including a wagon 1401 and a tilt hitch 1402. The wagon 1401 is depicted tilted at an angle relative to the horizontal axis of the tilt hitch 1402.

It will be appreciated to those skilled in the art that the preceding examples are not limiting in scope. It is intended that all permutations, enhancements, equivalents, and improvements thereto that are apparent to those skilled in the art upon a reading of the specification and a study of the drawings are included within the true spirit and scope of these teachings. It is therefore intended that the following appended claims include all such modifications, permutations, and equivalents as fall within the true spirit and scope of these teachings.

What is claimed is:

1. A system comprising:
   a wagon including a frame;
   a pivot hitch including a multi device attachment and a hitch insert lockable to a vehicle hitch receptacle for attachment to an externally attached vehicle; wherein, the pivot hitch further includes a faceplate adaptor coupled to the frame, the faceplate adaptor being connected to a faceplate for supporting weight during transport by a vehicle that is attached to the hitching receptacle; wherein, the faceplate includes rails having grooves to slide into the faceplate adaptor; wherein, in operation;
   the hitch insert of the pivot hitch is locked to the vehicle hitch receptacle,
   the externally attached vehicle in operation to transport the wagon is attached to the vehicle hitch receptacle.

2. The system of claim 1, further comprising, a receiver platform coupled to the hitch insert; and a guiding lip coupled to the receiver platform, lockable to the wagon.

3. The system as in claim 2, further comprising a locking pin locking the receiver platform to the loading stopper.

4. The system of claim 1 further comprising, cargo netting securing items disposed inside the wagon.

5. A system comprising:
   a wagon including a frame suitable for attachment to a hitching platform having a pivot hitch;
   the pivot hitch including a hitch insert lockable to a vehicle hitch receptacle for attachment to an externally attached vehicle
   wherein, the pivot hitch further includes a faceplate adaptor coupled to the frame
   the faceplate adapter being connected to a faceplate for supporting weight during transport by a vehicle that is attached to a hitching receptacle;
   wherein, the faceplate includes rails having grooves to slide into the faceplate adaptor.

6. The system of claim 5, wherein, the frame is coupled to Z-bars that attach to the hitching platform.

7. The system of claim 5, wherein, the wagon further includes a loading stopper coupled to the frame.

8. The system of claim 5, wherein, the hitching platform includes a hitch insert for locking to the vehicle hitch receptable.

9. The system of claim 8, wherein,
   the hitch insert is locked to a vehicle hitch receptacle,
   the wagon is attached to the receiver platform; and
   the wagon is locked to the loading stopper.

10. The system of claim 5,
    further comprising, a locking device to attach the faceplate to the faceplate adaptor of the wagon.

11. The system of claim 5, wherein, wagon includes a base coupled to the frame, the base including wheels.

12. The system of claim 1, wherein, in operation, the pivot hitch is connected to the faceplate.

13. The system of claim 1, further comprising, a locking device to attach the faceplate to the faceplate adaptor of the wagon.

14. The system of claim 1, further comprising, a set of Z-bars coupled to a frame of the wagon.

15. The system of claim 14, further comprising, a loading stopped coupled to the frame via an attachment to the set of Z-bars.

* * * * *